(12) United States Patent
Luzetsky et al.

(10) Patent No.: US 9,770,883 B1
(45) Date of Patent: Sep. 26, 2017

(54) FUEL CONTAINMENT AUTONOMOUS SELF-SEALING SYSTEM

(71) Applicants: Harry R Luzetsky, Kennett Square, PA (US); Kyle Bates, San Diego, CA (US)

(72) Inventors: Harry R Luzetsky, Kennett Square, PA (US); Kyle Bates, San Diego, CA (US)

(73) Assignee: SURVICE Engineering Company, Belcamp, MD (US)

(*) Notice: Subject to any disclaimer, the term of this patent is extended or adjusted under 35 U.S.C. 154(b) by 600 days.

(21) Appl. No.: 14/516,334

(22) Filed: Oct. 16, 2014

Related U.S. Application Data (60) Provisional application No. 61/891,491, filed on Oct. 16, 2013.

(51) Int. Cl.
  *B32B 3/26* (2006.01)
  *F17C 3/00* (2006.01)
  *B60K 15/00* (2006.01)
  *B32B 27/08* (2006.01)

(52) U.S. Cl.
  CPC ............... *B32B 3/26* (2013.01); *B32B 27/08* (2013.01); *B60K 15/00* (2013.01); *F17C 3/00* (2013.01); *B32B 2250/02* (2013.01); *B32B 2250/03* (2013.01); *B32B 2250/05* (2013.01); *B32B 2250/40* (2013.01); *B32B 2274/00* (2013.01); *B32B 2305/02* (2013.01); *B32B 2307/762* (2013.01); *B32B 2439/40* (2013.01); *B32B 2605/00* (2013.01)

(58) Field of Classification Search
  CPC ............... F17C 3/00; B60K 15/00; B32B 3/26
  See application file for complete search history.

(56) References Cited

U.S. PATENT DOCUMENTS

| | | | | |
|---|---|---|---|---|
| 3,664,904 | A * | 5/1972 | Cook | B64D 37/06 220/560.02 |
| 2006/0193569 | A1* | 8/2006 | Huston | H01B 7/288 385/100 |
| 2012/0168055 | A1* | 7/2012 | Bray | F16B 1/0071 156/64 |
| 2015/0097271 | A1* | 4/2015 | Ayotte | H01L 23/564 257/620 |

\* cited by examiner

*Primary Examiner* — Coris Fung
*Assistant Examiner* — Sathavaram I Reddy
(74) *Attorney, Agent, or Firm* — Peter Loffler (57) ABSTRACT

A seal-healing material that is used to form fuel tanks and other fuel containing items uses a pair of reagents disposed within multiple individual cells on either side of a polymer film with other polymer films forming the outer boundaries of each set of cells. The reagents, when mixed, chemically react to form a sealant. An elastomeric sheet is bound to each polymer film such that a fibrous material is disposed between each polymeric film and elastomeric film.

5 Claims, 6 Drawing Sheets

FUEL CONTAINMENT AUTONOMOUS SELF-SEALING SYSTEM

This application claims the benefit of U.S. provisional patent application, No. 61/891,491, filed on Oct. 16, 2013, which provisional patent application is incorporated herein by reference.

BACKGROUND OF THE INVENTION

1. Field of the Invention

The present invention relates to a self-sealing system that is used to form a fuel container such as a vehicle fuel tank or a fuel storage tank, wherein the system automatically self-seals immediately upon penetration damage to the system.

2. Background of the Invention

The construction of a fuel tank depends on the type of vehicle and/or structure onto which the tank is installed, and the vehicle or structure's usage or mission. Fuel tanks and systems in general are constructed of materials that do not react chemically with any fuels. For vehicles, some fuel tanks are an integral part of the structure while others rely on a fuel bladder that fits into a pre-designed fuel storage cavity. For those tanks that are integral to the structure, the structure has to be appropriately sealed to prevent leakage of fuel. Other aspects of tank design include access panels for inspection and repair, sumps and drains to collect water and sediments, and a fuel distribution system to transport the fuel between tanks and the propulsion system. Although these other features are critical to the fuel tank design, they do not affect the critical feature that effect the ability of the tank to contain the fuel and tolerate any damage, especially from penetrating events.

To address penetration damage in current fuel system design, there is a reliance on the fuel to activate the sealing mechanism. In a self-sealing fuel tank, the penetrator, such as a projectile or shrapnel, passes through the fuel tank wall into the fuel. After perforation by the penetrator, the elastic materials in the fuel tank wall spring back to yield a small entrance and exit hole. Once this has occurred, the leaking fuel contacts the inner layer of fuel tank wall which is composed of a sealant material, typically un-vulcanized rubber or gum rubber. Upon contact, the sealant material swells and completes the seal of the hole created by the penetrator, preventing further leakage of fuel. With this approach, the sealing process relies on swelling of the sealant material as it absorbs the liquid hydrocarbon fuel and the subsequent cohesion of the perforated sealant material that happens to spring back into contact with itself.

A typical self-sealing fuel tank is composed of various elements, which elements contribute to the self-sealing characteristic of the fuel containment system. These elements consist of four primary layers of materials. These layers are the inner liner, the nylon fuel barrier, the sealant, and the retainer. The vast majority of self-sealing fuel tanks currently in service contain these four primary layers of materials. If additional plies are used in the construction of the fuel tank, the additional plies will be related to one of these primary plies.

The inner liner material is constructed of Buna N synthetic rubber and its function is to prevent fuel from coming in contact with the sealant, thereby mitigating the potential for premature swelling or deterioration of the sealant. Buna rubber is an artificial substitute for crude or natural rubber which is produced from butadiene and sodium. Buna rubber is made in two types, which are Buna S and Buna N, with Buna S being the most common type of synthetic rubber. The Buna S, however, is unsuitable for use as an inner liner material since the petroleum hydrocarbons causes it to swell and eventually dissolve. Not being affected by petroleum hydrocarbons, Buna N is ideal for this application; however, due to its porous nature, a nylon barrier is necessary to prevent the fuel from contacting the sealant.

The second material in the system is an unbroken film of nylon designed to prevent fuel from diffusing into the fuel tank wall. This layer is typically brushed, swabbed, or sprayed in three or four hot coats to the outer surface of the inner liner during the construction process. The sealant material, which is made from a natural gum rubber, is the next material used in the fuel tank and it remains dormant until the tank is ruptured or penetrated by an object, such as a projectile. The sealing action occurs due to a chemical reaction that occurs between the sealant and the petroleum hydrocarbon based fuel. This reaction occurs as soon as vapors contact the material which causes it to extend or swell to several times its normal size. This process effectively closes the rupture and prevents the fuel from escaping.

The final material is the retainer which serves the purpose to provide strength and support for the tank while increasing the efficiency of the mechanical action by returning the fuel tank wall to its original shape when punctured. This layer is typically fabricated from cotton or nylon cord fabric impregnated with Buna N rubber.

Although self-sealing bladder type fuel tanks can differ in the types of materials used and their sequencing, the basic construction process remains the same. The use of elastomeric material on the inner and outer surface of the bladder act to minimize the hole size and the sealant material is activated by contact with the fuel and/or vapors causing it to swell thereby effectively sealing the puncture.

Other techniques exist to provide self-sealing capability to integral fuel tanks; however, these techniques tend to rely largely on the use of visco-elastic materials that can be applied to the interior of the fuel containment area. Upon penetration, the elasticity of the material minimizes the hole size and pressure from the fuel forces the material into the hole providing a seal. Unfortunately this approach, though it has similar features to the previously described self-sealing fuel tanks, is not as effective as that used in self-sealing fuel bladders.

Emphasis on reduced system and subsystem weight has pushed the application of these current self-sealing material technologies to marginal levels of performance. Recent testing of current state-of-the-art fuel tanks has demonstrated marginal levels of self-sealing performance for the required protection levels. The need to reduce weight while maintaining ballistic and crashworthy performance remain. Achieving weight reduction while maintaining desired protection levels, is not possible using fielded conventional fuel tanks materials and designs. In addition, initiatives in fuel development that emphasize the need for improved fuel efficiency, lower emissions, and alternative fuels, have resulted in efforts to reformulate fuels. The fundamental performance of the self-sealing technologies has been brought into question as changes in fuel compositions effect the absorption of fuel into the sealant material. Consequently, current wound sealing techniques can no longer be the sole methodology in designing self-sealing systems. Future fuel formulations require new approaches to self-sealing fuel tanks designs.

SUMMARY OF THE INVENTION

The fuel containment autonomous self-sealing system of the present invention offers a solution to the aforementioned needs in the art. The fuel containment autonomous self-sealing system is an autonomous self-sealing system that seals a perforation independently of contact with the fuel. The sealing process is activated solely by the penetration event. In addition, the fuel containment autonomous self-sealing system can be custom designed to fit various forms and functions, thereby possessing greater versatility than traditional self-sealing technology. The fuel containment autonomous self-sealing system can be customized to address various sizes of damage, integrated into a bladder design, and applied to integral fuel containment applications.

The fuel containment autonomous self-sealing system of the present invention is comprised a polymeric structure that a first outer surface and a second outer surface, each formed from an elastomeric layer. A first reagent is disposed within a series of first cells within the polymeric structure while a second reagent is disposed within a series of second cells within the polymeric structure such that the first cells and the second cells are separated from one another. When the first reagent and the second reagent mix due to a perforation through some of the first cells and some of the second cells allowing the first reagent and the second reagent to mix, the first reagent and the second reagent chemically react forming a sealant. The series of first cells are kept separate from the series of second cells by a polymeric sheet that is frangible. The first reagent may have a foaming agent that causes expansion of the combined first reagent and the second reagent whenever the first reagent and the second reagent are mixed. A first elastomeric layer is bound to the first outer surface of the polymeric structure such that a first fibrous material is disposed between the first elastomeric layer and the polymeric structure while a second elastomeric layer bound to the second outer surface of the polymeric structure such that a second fibrous material is disposed between the second elastomeric layer and the polymeric structure.

BRIEF DESCRIPTION OF THE DRAWINGS

Similar reference numerals refer to similar parts throughout the several views of the drawings.

DESCRIPTION OF THE PREFERRED EMBODIMENT

Referring now to the drawings, it is seen that the fuel containment autonomous self-sealing system of the present invention, generally denoted by reference numeral 10, is comprised of a pair of subsystems, namely the flow restriction and damage bridging subsystem 12 and the reagent sealing subsystem 14 such that the reagent sealing subsystem 14 is bounded on either side by the flow restriction and damage bridging subsystem 12.

Figure 3:
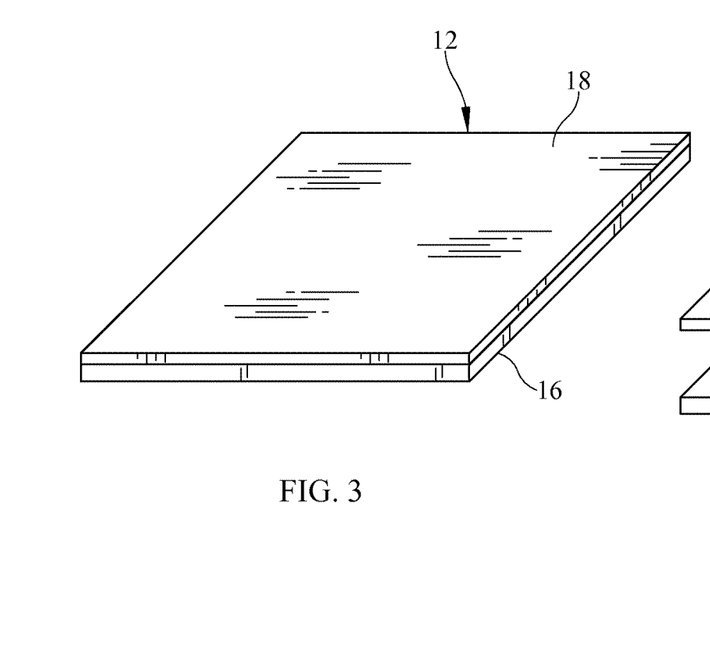
FIG. 3 is a sectioned perspective view of a portion of the flow restriction and damage bridging subsystem of the fuel containment autonomous self-sealing system.
Figure 4:
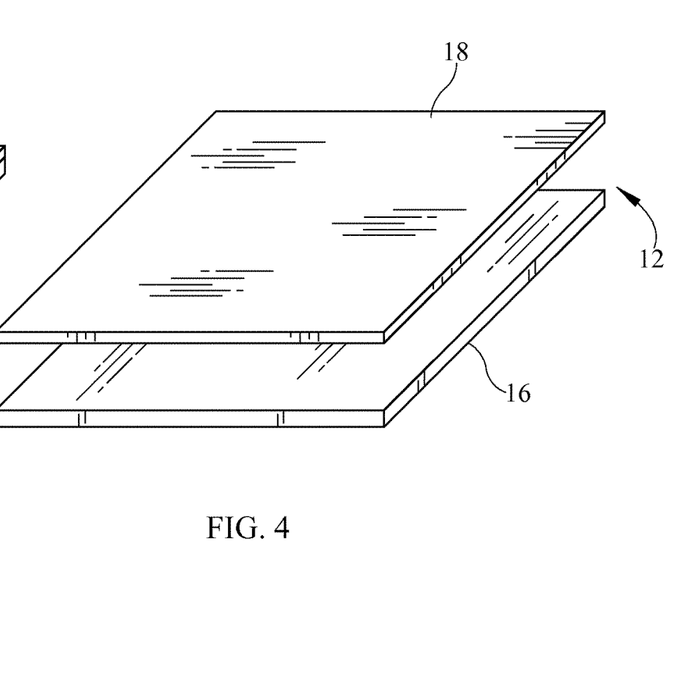
FIG. 4 is an exploded perspective view of the portion of the flow restriction and damage bridging subsystem of FIG. 3.

Each flow restriction and damage bridging subsystem 12 is a dual layer member that has a highly elastic elastomeric material layer 16 that is bound to a bridging material layer 18. The bridging material layer 18 is comprised of inert fibrous elements that are compatible with the sealing reagents used within the system 10 and fluids held in the fuel storage container. Typically these fibers are fiberglass, but are modified as required depending on the fluids and sealant reagents used. The bridging material 18 is loosely contained between the elastomeric material layer 16 and the polymer film 20, described below. The bridging material 18 is retained by the seal developed around the edge of the various layers that form a cell. This mechanical capturing of the material permits its free expansion when penetrated, allowing it to better fill the void created by a penetrating act and perform its fluid flow restriction function. To facilitate assembly, a tack adhesive may be used to fix the bridging material's position, but this is done sparingly and does not affect the integrity of the system.

Figure 5:
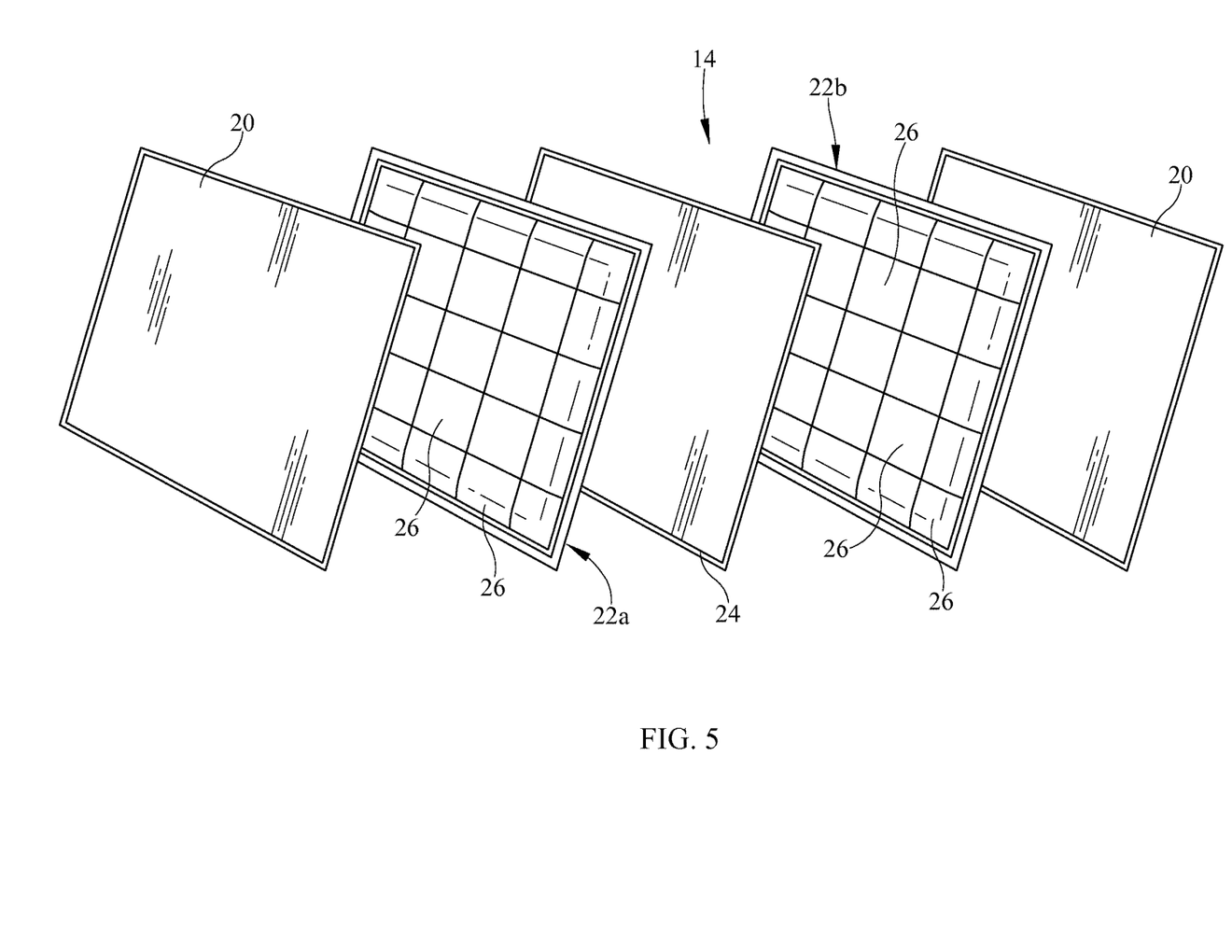
FIG. 5 is an exploded perspective view of a portion of the reagent sealing subsystem of the fuel containment autonomous self-sealing system in a two layer configuration.
Figure 6:
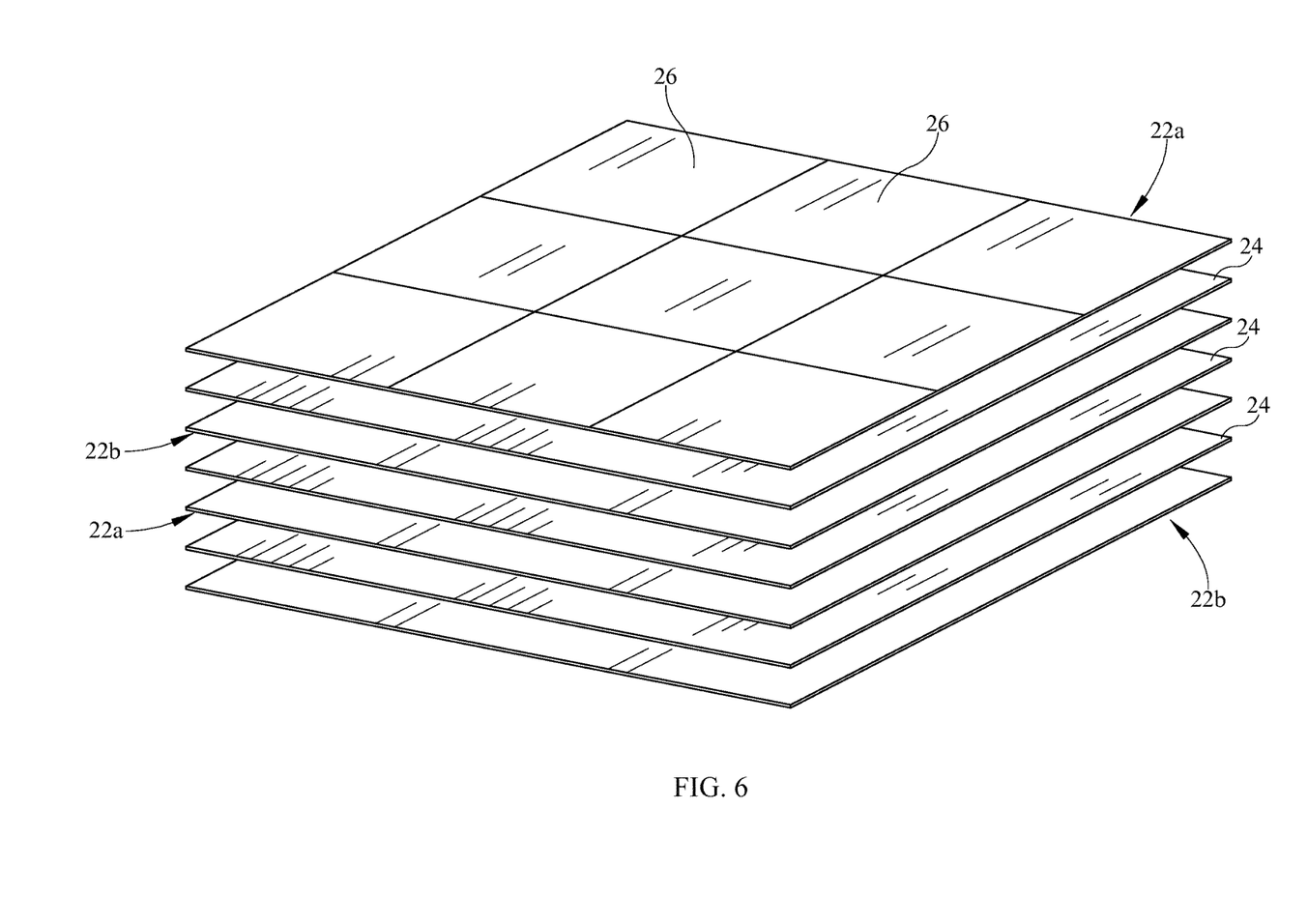
FIG. 6 is an exploded perspective view of a portion of the reagent sealing subsystem of the fuel containment autonomous self-sealing system in a multi-layer configuration with the polymer film layers removed for brevity and clarity.

The reagent sealing subsystem 14 is comprised of a pair of polymer film layers 20 that form the outer skins of the reagent sealing subsystem 14. Located between the polymer film layers 20 are two or more reagent layers 22a and 22b. A second reagent layer 22b is separated from the first reagent layer 22a by another polymer film material separator layer 24. As seen, each reagent layer 22a and 22b is formed into multiple individual cells 26, which includes the illustrated polygon cells of any desired geometry, channels, voids, etc., such that the reagent 22a and 22b in each cell 26 is separated from the reagent 22a and 22b in adjoining cells 26, the polymer film 20 forming the individual cells 26 against the separator layer 24, the polymer film 20 also minimizing air permeability between individual cells 26. The cells 26 holding the first reagent 22a and the cells 26 holding the second reagent 22b may be, but need not necessarily be of the same size, and may, but need not necessarily correspond in position (the cells overlay each other) with one another. The various layers 20, 22a, 22b, and 24 are bound to their respective adjoining layers in appropriate fashion. The method of joining varies based on the system application, and involves the use of adhesives and/or thermal sealing of the layers 20, 22a, 22b, and 24 to one another along the perimeter of the abutting layers 20, 22a, 22b, and 24. The key element is to attach the layers 20, 22a, 22b, and 24 without impeding their functionality or that of the contained reagents 22a and 22b. As seen in FIG. 5, the reagent sealing subsystem 14 can be constructed as a two layer reagent layer 22a and 22b configuration, or as seen in FIG. 6, the reagent sealing subsystem 14 can be constructed as a multi-layer reagent layer configuration such that each first reagent layer 22a is adjacent to one or more second reagent layers 22b and vice versa with each reagent layer 22a separated from any adjoining reagent layers 22b, by a polymer film separator material layer 24, the number of reagent layers 22a and 22b used depending on the application including the perceived threats that may be encountered. The reagent layers 22a and 22b are selected for the specific type of containment system based on compatibility with the fluid being stored, environmental conditions, basic system parameters such as weight, and degree or size of perforation to be considered and may include polyurethane reagent system where one reagent is a polyol and the other, an isocyanate or epoxy reagent system where one reagent is a polyepoxide prepolymer (or resin) and the other, a catalytic hardener, among others. The materials of the two layers 22a and 22b are quick reacting with one another and have a viscosity that provides a balance in flow properties to support mixing, leading to activation without escaping from the containment cell 26. The outer reagent layers 22a or 22b may have a higher viscosity relative to any inner layers to permit faster mixing.

Figure 1:
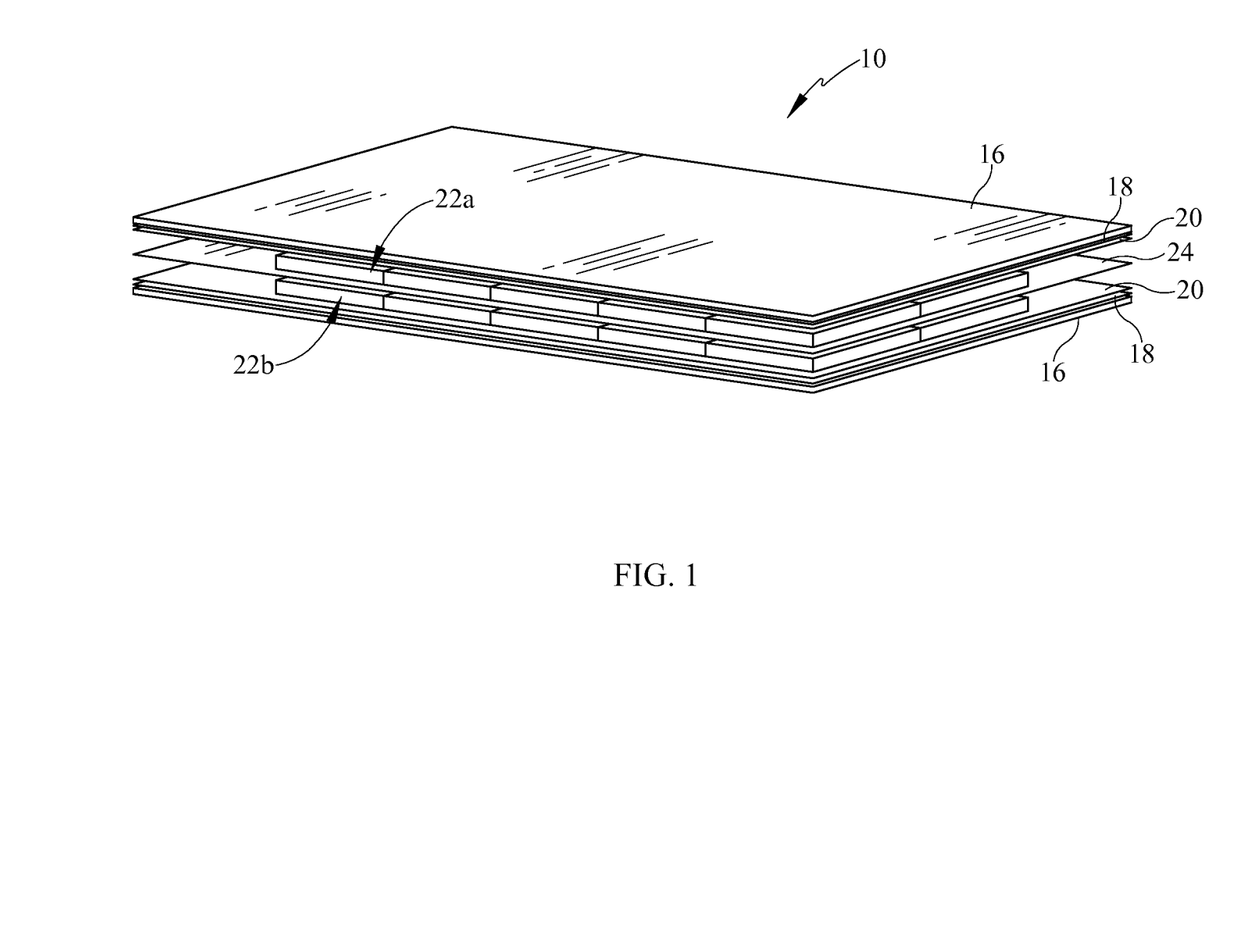
FIG. 1 is a sectioned perspective view of a portion of the fuel containment autonomous self-sealing system of the present invention.
Figure 2:
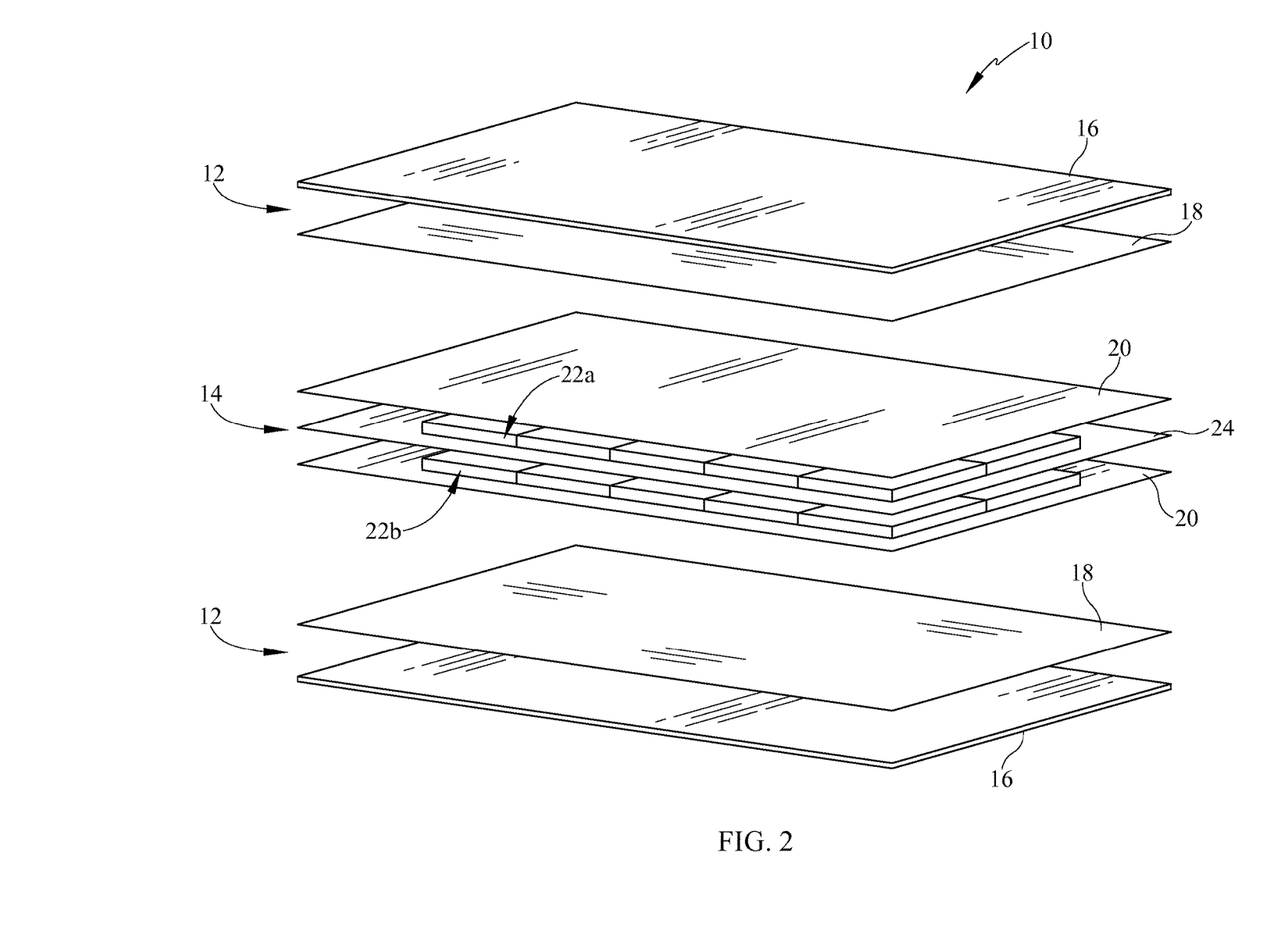
FIG. 2 is an exploded perspective view of the portion of the fuel containment autonomous self-sealing system of FIG. 1.

The fuel containment autonomous self-sealing system 10 is constructed by having a pair of flow restriction and damage bridging subsystems 12 form the outer skin and inner skin of the fuel containment autonomous self-sealing system 10 with a reagent sealing subsystem 14 sandwiched between this pair of flow restriction and damage bridging subsystems 12. The elastomeric material layer 16 of each flow restriction and damage bridging subsystem 12 faces outwardly with the elastomeric material layer 16 of the other flow restriction and damage bridging subsystem forming the inside of the fuel container facing inwardly (not illustrated). The bridging material layer 18 is attached to the outer surface of its respective polymer film layer 20 in appropriate fashion. The bridging material layer 18 is loosely contained between the elastomeric material layer 16 and the elastic polymer film layer 20. It is retained by the seal developed around the edge of the elastomeric material layer 16 and the polymer film layer 20, the bridging material layer 18 captured therebetween. This mechanical capturing of the material permits its free expansion when penetrated allowing it to better fill the void created and to perform its fluid flow restriction function. To facilitate assembly, a tack adhesive may be used to fix its position, but this is done sparingly and does not affect the integrity of the system.

Figure 7:
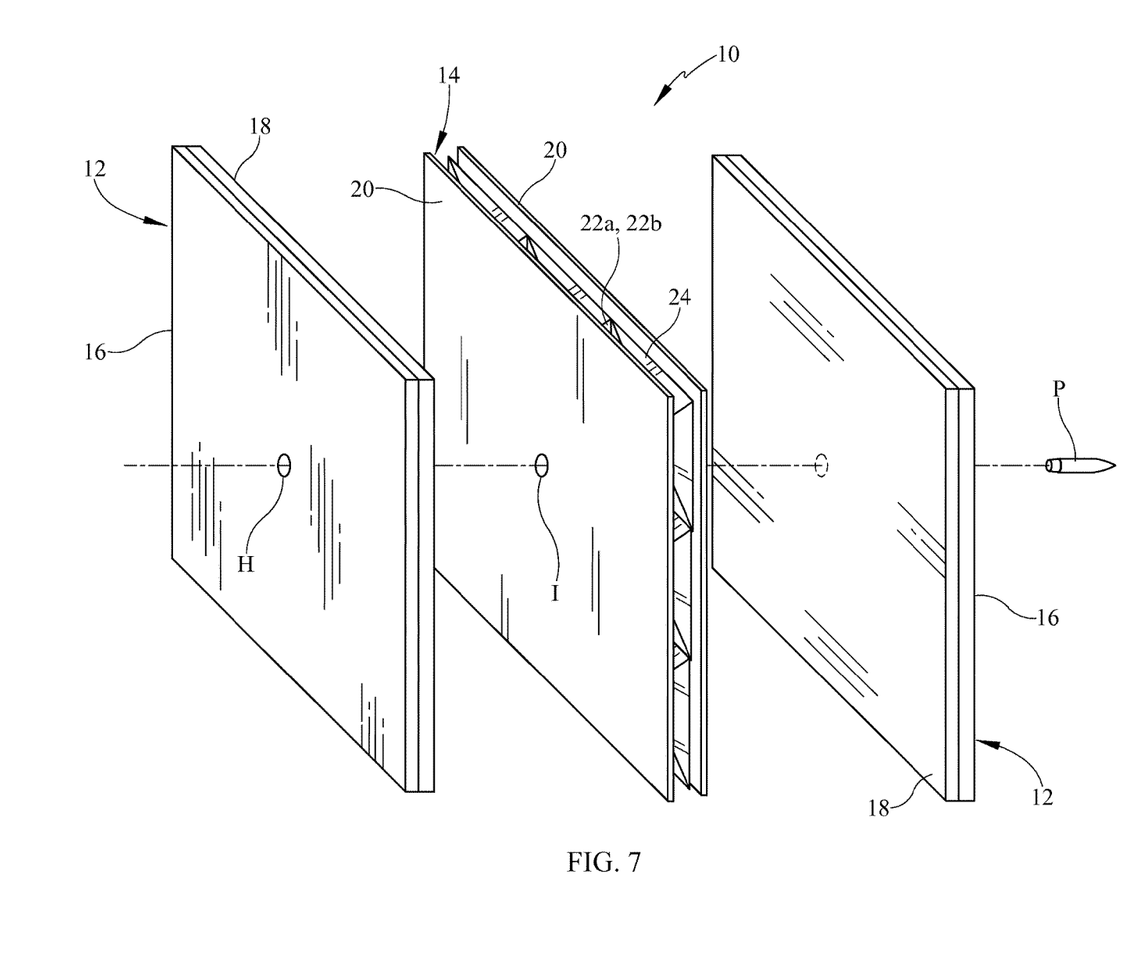
FIG. 7 is a perspective of a portion of the fuel containment autonomous self-sealing system, exploded, with a penetration through a portion of the system.

When perforation of the fuel containment autonomous self-sealing system 10 occurs, the projectile P (bullet, shrapnel, etc.), initially penetrates the elastomeric layer 16 of the outer flow restriction and damage bridging subsystem 12. As this elastomeric layer 16 is highly elastic, this elastomeric layer 16, upon being penetrated, quickly expands and snaps back, which helps minimize the penetration hole H. Thereafter, the projectile P travels through the bridging material layer 18 of this flow restriction and damage bridging subsystem 12, the bridging material layer 18 further helping in the development of a seal from the penetration. The bridging material layer 18 serves two basic function which are to restrict fluid movement from the storage container into the sealing reagents 22a and 22b and from the sealing reagents 22a and 22b to either the contained fluid and/or exterior of the system 10, and to act as a nucleating site to support the formation of the seal. In the case of restricting fluid flow, the fibrous material acts as a loose barrier to retard this movement. It is designed to provide adequate time for the reagents 22a and 22b to react with one another, thereby forming the seal. Second, the bridging material layer 18 acts a site for the reactants 22a and 22b to attach to as the reagents chemically react with one another during the sealing process, and provide a reinforcing feature for bridging the hole H. Essentially, the reacted reagents 22a and 22b only need to bridge the fibers in the bridging material layer 18 and not the entire expanse of the hole H during the initial sealing stages. Thereafter, the projectile P penetrates the outer elastic polymer film layer 20 of the reagent sealing subsystem 14. The elastic nature of the elastic polymer film layer 20 helps minimize the penetration hole H on this layer. Thereafter, the projectile P penetrates one or more cells 26 of the first reagent layer 22a, Thereafter, the projectile P penetrates the polymer film separator material layer 24 and thereafter penetrates one or more cells 26 of the second reagent layer 22b, thereby causing the reagent 22b within the penetrated cell 26 or cells 26 of this reagent layer 22b to mix with the previously penetrated cell 26 or cells 26 of the first reagent layer 22a, causing the two reagents 22a and 22b to mix, resulting in a chemical reaction between the reagents. This reaction provides a bonding mechanism that fuses the perforated layers together. For a system design that accommodates large perforations due to the removal of the elastomeric layer by the perforating event, resulting in a gaping hole, selected reagents 22a and 22b include those with a foaming component, that upon activation, possess an expansion agent resulting in a volumetric increase in the material which fills the void of the missing material thereby facilitating a seal, further sealing the penetration hole H therethrough. The polymer film separator material layer 24, by being frangible, maximizes the hole of penetration through this polymeric film separator material layer 24, in order to facilitate the interaction of the functioning reagents 22a and 22b (the reagents 22a and 22b of the cells 26 that have been penetrated) between the adjoining reagent layers 22a and 22b, which helps quickly seal the penetration hole H. Thereafter, the projectile P penetrates the inner elastic polymer film layer 20 of the reagent sealing subsystem 14. Again, the elastic nature of the elastic polymer film layer 20 helps minimize the penetration hole on this layer (if the penetration of the fuel containment autonomous self-sealing system 10 is a multi-layer reagent layer 22a and 22b configuration, the projectile P penetrates the next polymeric film separator material layer 24 and then the next first reagent layer 22a and thereafter the next polymeric film separator material layer 24 and thereafter the next second reagent layer 22b and continues in this fashion until encountering the inner elastic polymer film layer 20). It is not necessary for the innermost reagent layer to be a second reagent layer 22b, for if the innermost reagent layer is a first reagent layer 22a, then this layer 22a simply mixes with the second reagent layer 22b that had been penetrated just prior to the penetration of the innermost layer, going through the polymeric film separator material layer 24 that separates the two reagent layers 22b and 22a. Thereafter, the projectile P travels through the bridging material layer 18 of the inner flow restriction and damage bridging subsystem 12, the bridging material layer 18 further helping in the development of a seal from the penetration. Finally, the projectile P penetrates the elastomeric layer 16 of the inner flow restriction and damage bridging subsystem 12. Again, as this elastomeric layer 16 is highly elastic, this elastomeric layer 16, upon being penetrated yields and quickly snaps back to shape which helps minimize the penetration hole.

The use of multiple cells 26 within each reagent layer 22a and 22b allows for the capability to seal multiple perforations. Each cell 26 is sized to provide sufficient reagent material for a given penetration without overwhelming the damage site, thereby wasting reagent material 22a and 22b.

While the invention has been particularly shown and described with reference to an embodiment thereof, it will be appreciated by those skilled in the art that various changes in form and detail may be made without departing from the spirit and scope of the invention.

We claim:

1. A self-healing material comprising:
    a polymeric structure having a first outer surface and a second outer surface;
    a first reagent disposed within a series of first cells within the polymeric structure; and
    a second reagent disposed within a series of second cells within the polymeric structure such that the first cells and the second cells are separated from one another such that when the first reagent and the second reagent mix due to a perforation through some of the first cells and some of the second cells allowing the first reagent and the second reagent to mix, the first reagent and the second reagent chemically react forming a sealant.

2. The self-healing material as in claim 1 wherein the series of the first cells are kept separate from the series of the second cells by a polymeric sheet that is frangible.

3. The self-healing material as in claim 1 wherein the first reagent has a foaming agent that causes expansion of the combined first reagent and the second reagent whenever the first reagent and the second reagent are mixed.

4. The self-healing material as in claim 1 further comprising a first elastomeric layer bound to the first outer surface of the polymeric structure wherein a first fibrous material is disposed between the first elastomeric layer and the polymeric structure.

5. The self-healing material as in claim 4 further comprising a second elastomeric layer bound to the second outer surface of the polymeric structure wherein a second fibrous material is disposed between the second elastomeric layer and the polymeric structure.

* * * * *